2,836,015

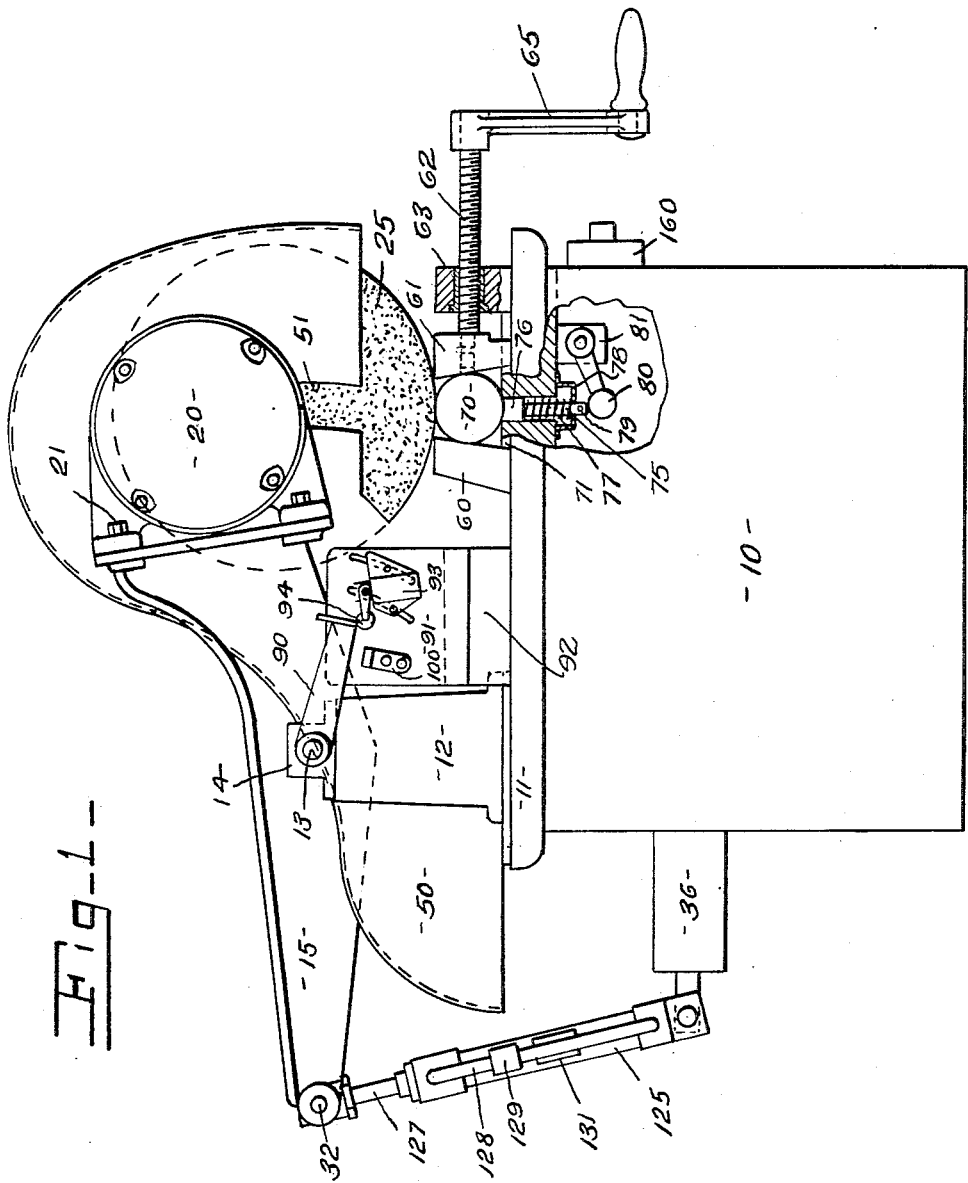

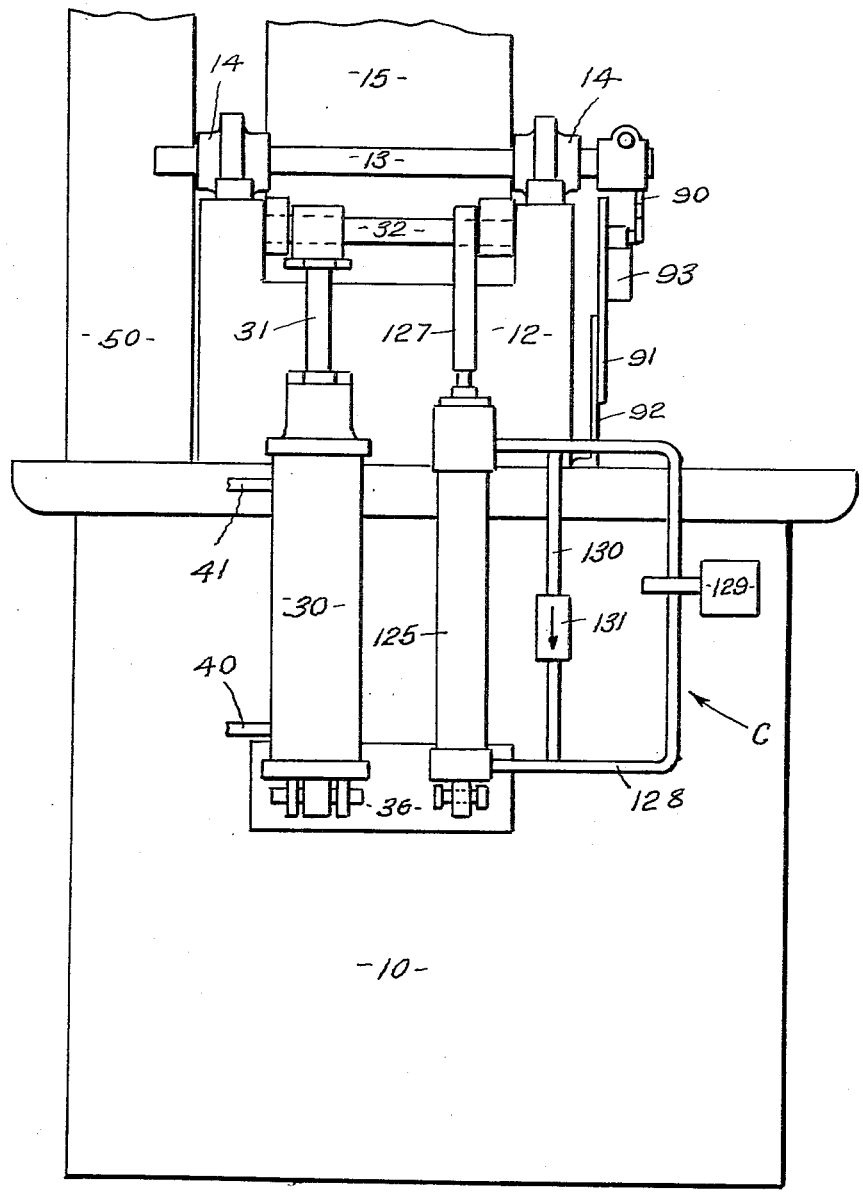

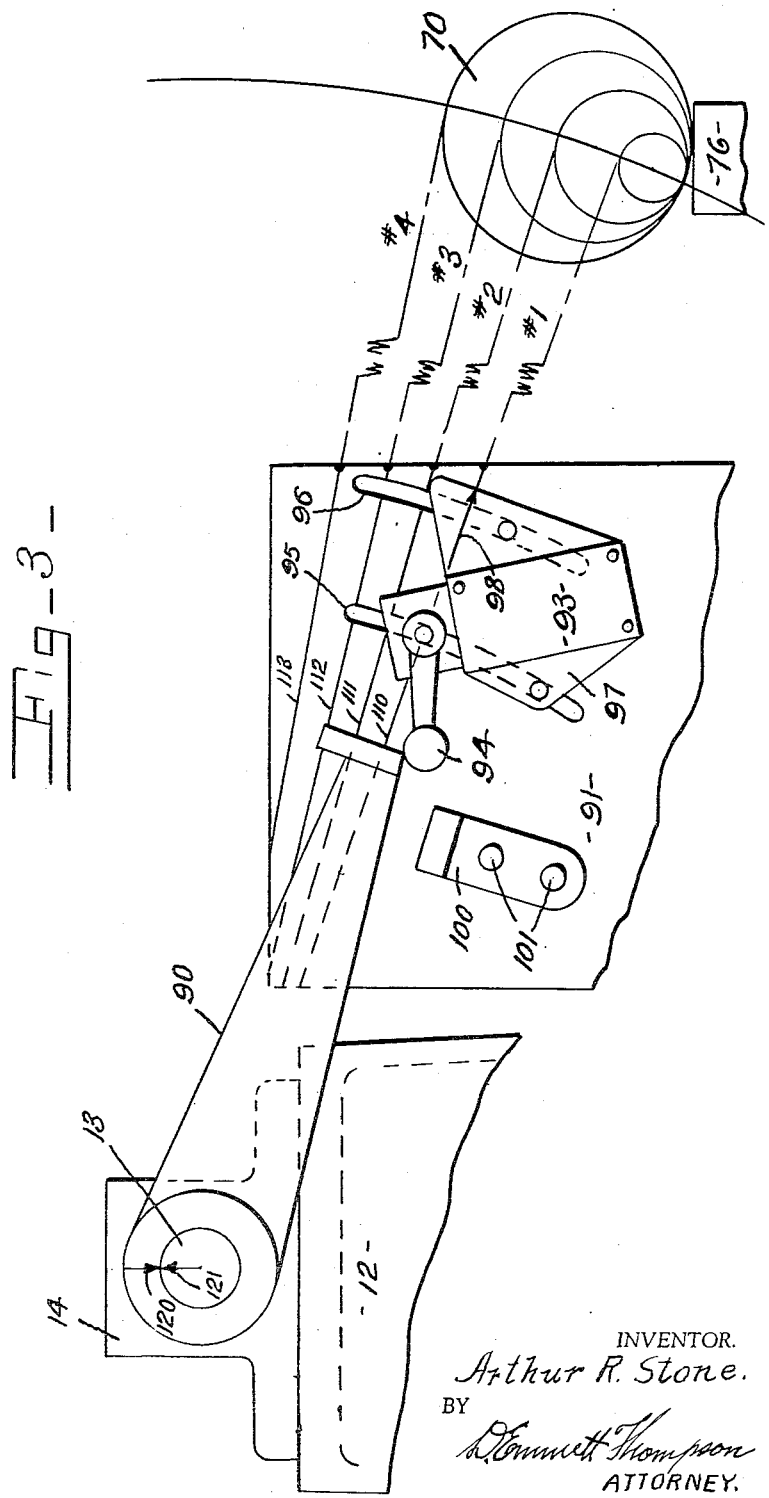

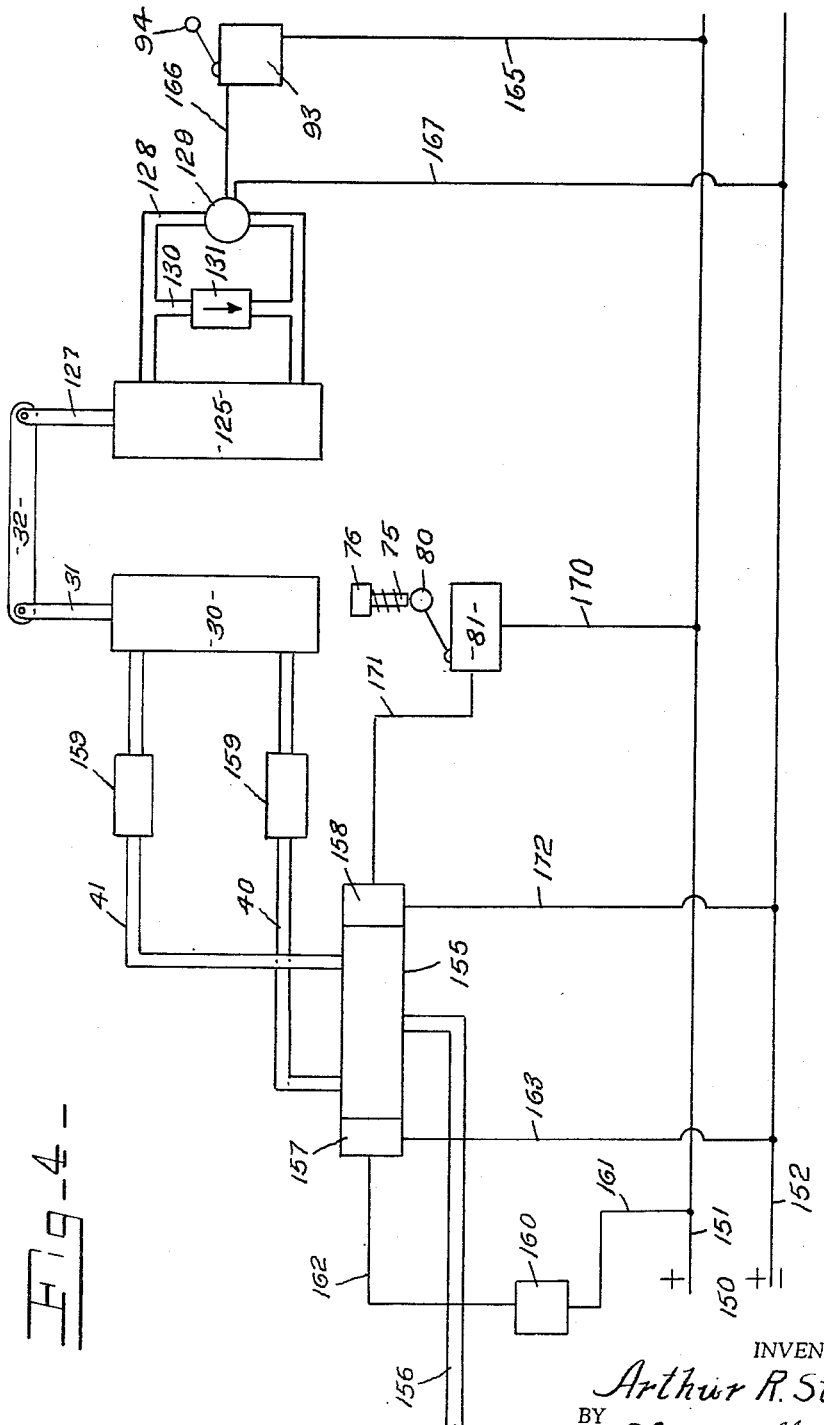

CUT-OFF MACHINE

Arthur R. Stone, Fayetteville, N. Y.

Application July 24, 1957, Serial No. 673,899

5 Claims. (Cl. 51—98)

This invention relates to cut-off machines wherein the cutting tool, which is usually in the form of an abrasive wheel, is mounted for movement to and from the work piece. Conventionally, in machines of this type, the power-operated cutter is carried by an arm pivotally mounted on the machine, the movement of the arm being effected by power means, such as a fluid operated piston and cylinder structure.

In machines of this type, the power actuator for moving the cutter tool to and through the work piece is arranged to provide rapid movement of the tool toward the work piece until the tool is in proximity thereto. Thereafter, the movement of the tool through the work piece is effected at a slower rate to provide a proper feed speed for the cutter. Inasmuch as the cutter tool is usually in the form of an abrasive wheel, the periphery of the wheel is worn away during the cutting operation, whereby the diameter of the wheel is reduced, thus causing the wheel to be moved through a greater distance from its initial position before the wheel contacts the work piece.

In arrangements heretofore employed, this resulted in the necessity of frequently adjusting the control mechanism for shifting from the high feed speed to the low feed speed. Otherwise, when the abrasive wheel had become substantially reduced in diameter, the slow speed feed would become effected while the wheel is still an appreciable distance from the work piece. This results in consuming an appreciably greater length of time than necessary for the machine to perform its cutting cycle and thereby greatly reduces the productive output of the machine.

This invention has as an object an arrangement which functions, upon each cutting operation, to automatically compensate for the wear effected upon the abrasive wheel whereby, regardless of the diameter of the wheel, its peripheral edge is always positioned in proximity to the work piece during the initial fast feed movement, the slow feed movement only taking place for the actual cutting of the work piece.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a side elevation of the invention with parts broken away and partly in section for purposes of clarity.

Figure 2 is a rear elevational view of the invention.

Figure 3 is a diagrammatic fragmentary view of a portion of the invention.

Figure 4 is a schematic view of the control system of the invention.

Referring to Figure 1, the cut-off machine is made up of a base 10 on which a channeled table 11 is mounted. A bracket 12 is mounted on the upper surface of the table 11 and carries the central pivot shaft 13 journalled in a pair of bearings 14.

Fixedly mounted on the shaft 13 is a carrying arm 15 which has a motor 20 mounted by means of fasteners 21 on the inner end of the arm 15. The motor drives an abrasive wheel 25 by means of a reduction gear box to which the armature shaft of the motor is connected (not shown). Affixed to the rear or outer end of the arm 15 is a main cylinder 30. The cylinder piston is connected by means of the rod 31 to a shaft 32 formed on the rear of the arm 15. At its lower end, the cylinder 30 is pivotally mounted to the block 36 on the rear of the base 10. The piston in the cylinder 30 is a double acting piston, and the cylinder 30 is provided, at its ends, with fluid lines 40 and 41. A closed fluid system check means, generally designated at C, see Figure 2, is also mounted on the rear of the machine, for a purpose hereinafter described.

A guard or shield 50 is mounted on the table 11 of the machine and has an arcuate slot 51 on its inner side in which the arbor of the abrasive wheel 25 moves with the arm 15.

In Figure 1, the machine has been shown with a hand vise mounted on the table 11, consisting of a fixed jaw 60 and a movable jaw 61 advanced toward the fixed jaw 60 by means of the screw 62 mounted in the bearing nut 63. The screw 62 is rotated so as to move the jaw 61 towards and away from the jaw 60, by means of the handle 65. The work piece 70 is shown in Figure 1 to be a cylindrical bar and is mounted on the base plate 71 of the hand operated vise.

A plunger 75 having a carbide head 76 is mounted for vertical movement in the table top immediately below the work piece 70. A coil compression spring 77 is shown mounted between the under side of the carbide head 76 and a bracket 78 fixed to the under side of the table 11 in order to yieldingly bias the carbide head 76 in an upward position determined by pin 79 engaging the bracket 78. The inner end of the plunger 75 is in contact with the actuator 80 of a limit switch 81, for a purpose hereinafter described.

Referring now to Figures 1 and 3, a lever 90 is frictionally mounted on the shaft 13 carried by the bearings 14 on the bracket 12. The lever 90 is mounted to move in an oscillatory fashion with the shaft 13 and arm 15. A plate 91 is fixed to an angle iron 92 extending upwardly from the table and carries a limit switch 93 having an actuator 94 which is positioned in the path of movement of the lever 90. Plate 91 contains a pair of arcuate slots 95 and 96, so as to adjustably mount the plate 97 on which the switch 93 is mounted. Plate 97 is provided with an arrow 98 on its surface, for a purpose hereinafter described. Also mounted on the plate 91 is a right angled fixed stop 100 affixed to the plate 91 by fasteners 101.

As will be seen in Figure 3, the plate 91 is provided with score lines 110, 111, 112 and 113. These score lines are positioned on the plate 91 along lines taken from the center of the shaft 13 extending to the top of the work pieces 70, shown as being four different sizes in Figure 3. Assuming, for example, the work pieces 70 are cylindrical bars of 1", 2", 3" and 4" diameters, score lines 110, 111, 112 and 113, and the numbers 1, 2, 3 and 4, shown on the plate 91, correspond to the thickness of the respective work pieces 70, as is indicated by the dash lines extending in broken fashion from the numbers 1, 2, 3 and 4, to the various size work pieces 70. To properly position switch 93, it is merely necessary to align arrow 98 with proper score line corresponding to the thickness of the work piece 70. Stop 100 is positioned for engagement by arm 90 when the cutter 25 engages the carbide head 76.

As is also shown in Figure 3, lever 90 is provided with an arrow 120 which is aligned with an arrow 121 on the end of shaft 13 so as to properly position the lever 90 in angular relation with the arm 15 when a new abrasive wheel 25 is mounted in the machine.

Referring now to Figure 2, the check means, generally indicated at C, consists of a fluid cylinder 125 fixed in pivotal fashion at its lower end to the block 36 on the rear of the housing 10. The piston in the cylinder 125 is fixed by means of a rod 127 to the shaft 32 on the end of the arm 15. The cylinder 125 has a fluid line 128 communicating with the upper and lower ends of the cylinder, and the piston in cylinder 125 is of the double acting type. Intermediate the ends of the line 128 is a solenoid actuated valve 129, for a purpose hereinafter described. A branch line 130 is provided with a one-way flow control valve 131, the line 130 providing a by-pass circuit when valve 129 is closed.

Referring now to Figure 4, which is a schematic illustration of the control system of the invention, a power source, indicated at 150, having a hot side 151, and a common or return side 152, is shown. A master four-way solenoid operated valve 155 has a fluid supply line 156, and is operated by the solenoids 157 and 158. Cylinder 30 is supplied with fluid at its lower end through the line 40, having a flow control valve 159, from the master four-way valve 155 when the solenoid 157 is operated. The upper end of cylinder 30 is provided with fluid through the line 41, also having a flow control valve 159, from the master valve 155 when it is operated by the solenoid 158. The pistons in the cylinders 30 and 125 are connected to the shaft 32 by means of the rods 31 and 127, so that when the rod 31 of cylinder 30 is moved, the rod 127 of cylinder 125 is also moved.

In operation, the starter switch 160, shown also in Figure 1, is actuated manually so as to provide a circuit from the line 151, through the line 161, switch 160 and line 162, to actuate the solenoid 157 through return wire 163 to the line 152. This allows the fluid in the master valve 155 to enter the lower end of the cylinder 30 through the supply line 40 and flow control valve 159, which may be adjusted. The fluid thus acting upon the piston within the cylinder 30 moves the rod 31 upward and correspondingly, arm 15 carrying the abrasive wheel 25 downward about shaft 13 in rapid fashion toward the work piece 70. As the wheel 25 approaches the work piece 70, the lever 90 on the shaft 13, which moves with the shaft 13 and arm 15, strikes and continues to hold down actuator 94 of the limit switch 93, which has been previously properly positioned by aligning arrow 98 with the proper score line on plate 91, at a point when wheel 25 is approximately 1/8 of an inch above the work piece 70. This completes a circuit from the hot line 151, through line 165, switch 93 and line 166, to the solenoid actuated valve 129, and from the valve 129, through the line 167, to the common return 152. This energizes the solenoid so as to close the normally open valve 129 in the line 128. The fluid therefore in the cylinder 125 is forced through the branch line 130 and flow control valve 131, thereby slowing the upward movement of the rod 31 and correspondingly, the arcuate motion of the arm 15 and abrasive wheel 25, so as to properly cut the work piece 70. As the wheel 25 completes its cut, it strikes the carbide head 76 on the spring loaded plunger 75, thereby engaging the actuator 80 of the switch 81. This actuation of the switch 81 completes a circuit from the line 151, through line 170, switch 81 and line 171, to the solenoid 158, and from the solenoid 158 by line 172, to the common return 152. The actuation of the solenoid 158 now causes fluid to enter the top of the cylinder 30 through the line 41 and flow control valve 159, thus rapidly forcing the piston and rod 31 downwardly in the cylinder 30, thereby effecting an upward or return movement of the arm 15 and abrasive wheel 25. Since the flow control valve 131 is a one-way valve, it will not retard the flow of fluid through the valve 131 from the cylinder 125 in the opposite direction, whereby there will be no retardation of the speed of return movement of the arm 15 by the cylinder 125.

As each successive cut on a long piece of bar stock 70 is made, the wheel 25 is worn down so as to decrease the diameter of the wheel 25. Unless this is compensated for, the arm 15 will begin the slow cutting feed when the wheel 25 is at a point greatly removed from the work piece 70, thereby increasing the total time necessary for the cutting operation. Accordingly, the lever 90, which is frictionally mounted on the arm 13, moves into engagement with the fixed stop 100, after striking the actuator 94 of the limit switch 93. Since the stop 100 is positioned along a line extending from the center of the shaft 13 to the carbide head 76, the lever 90 will on the first cut with a new wheel 25 contact the fixed stop 100 simultaneously with the wheel contacting the carbide head 76 which, as previously explained, acts to return the cutting wheel 25 to its upper position. However, since each cutting operation wears the wheel somewhat, on the next and succeeding cutting operations, the lever 90 will strike the stop 100 before the wheel 25 has completed its cut of the work piece 70. The distance that the wheel 25 and arm 15 travels after the lever 90 has made contact with the stop 100 is the amount that the wheel has worn and is thereby automatically compensated for on the next successive cutting operation.

This operation will be repeated with each successive cut until the abrasive wheel has completely worn itself beyond any further use, at which time the arm 15 reaches a permanent fixed stop (not shown), and the wheel 25 is then replaced with a new wheel. When the wheel is replaced with a new wheel, the arrow 120 on the lever 90, and the arrow 121 on the shaft 13 are positioned in alignment to properly angularly dispose the lever 90 with respect to the arm 15 for the new wheel 25.

What I claim is:

1. A cut-off machine comprising a frame, a work piece support, an arm pivotally mounted in the frame, a rotary cutting tool carried by said arm, power means for moving said arm about its pivot to move said cutting tool toward and from a work piece on said support, a switch operating member frictionally coupled to said arm for movement therewith, a switch mounted on the frame for engagement by said switch operating member when said cutting tool is positioned in proximity to the work piece upon movement of said arm toward the work piece support, a control means associated with said arm and operable upon engagement of said operating member with said switch to slow the speed of further movement of the arm toward the work support while said cutting tool is cutting the work piece, means operable upon contact by said cutting tool upon completion of the cutting operation to effect reversal of said power means to cause movement of said arm and cutting tool away from said work support, and a stop fixedly mounted on the frame for engagement by said switch operating member during the latter part of the cutting operation.

2. An automatic cut-off machine having an arm mounted on a shaft for oscillation about the axis of said shaft, a rotating cutting tool mounted on the end of said arm, means for moving said arm at a relatively fast speed toward a piece of work mounted on said machine, means for slowing the speed of the arm at a point just prior to the point of contact of said tool with said work, means for returning said arm to its upper position after said work has been cut, cut-off tool wear compensating means comprising a lever frictionally mounted for oscillation on said shaft in predetermined angular relation to said arm, switch means adjustably mounted on said machine in the path of travel of said lever, whereby said lever actuates said switch upon downward movement of said arm to actuate said means to slow the speed of movement of said arm, a stop fixedly mounted in the path of travel of said lever, said stop being mounted in a position whereby said lever will contact said stop simultaneously with the first complete cut of said cut-off tool, and said arm will move angularly beyond said lever when said lever contacts said stop on each successive cutting operation, whereby the wear on said cut-off tool will be compensated for.

3. An automatic cut-off machine including a pivotally mounted arm carrying a rotating cutting tool, fluid motive means for moving said arm rapidly to a point in proximity to the work mounted in the machine, means for effecting a slow cutting speed of said arm after said point has been reached comprising an actuating lever frictionally mounted on the shaft carrying said cutting arm in a predetermined angular relation with said arm, a limit switch actuated by said lever when said cutting tool reaches said point to slow the speed of said arm, cutting tool wear compensating means comprising a fixed stop positioned below said limit switch, said stop being positioned to engage said lever at the limit of travel of said carrying arm, whereby the wear on the cutting tool caused by each cutting operation will be compensated for in the next successive cutting operation.

4. Cutting tool wear compensating means for an automatic cut-off machine with a cut-off tool carrying arm having a fast approach speed and slow cutting speed relative to the work mounted in the machine, comprising a lever frictionally mounted on the shaft carrying said arm, said lever being positioned to actuate means for slowing the speed of said arm at a point when said cut-off tool is in proximity to said work, a fixed stop mounted in the line of motion with said lever below said limit switch, said stop being mounted in a position so as to engage said lever when said carrying arm has reached the limit of its downward motion whereby, when said cutting tool has become worn due to the cutting operation, said arm will move angularly relative to said lever to compensate in each successive cutting operation for wear effected on said tool in the previous cutting operation.

5. Claim 4, wherein said limit switch is adjustably mounted on said machine to provide for work pieces of varying size.

References Cited in the file of this patent

UNITED STATES PATENTS

| | | |
|---|---|---|
| 2,467,161 | Sheeley | Apr. 12, 1949 |
| 2,693,057 | Eastwood | Nov. 2, 1954 |